United States Patent
Huang et al.

(10) Patent No.: US 8,064,957 B2
(45) Date of Patent: Nov. 22, 2011

(54) COMMUNICATION APPARATUSES FOR HANDLING APPARATUS TERMINATED OR ORIGINATED COMMUNICATION REQUESTS WITH INCREASED COMMUNICATION CAPABILITY AND METHODS THEREOF

(75) Inventors: Li-Chi Huang, Taipei Hsien (TW);
Shun-Wen Hsiao, Taipei (TW);
Ding-Chiang Tang, Taipei (TW)

(73) Assignee: MediaTek Inc., Hsin-Chu (TW)

( * ) Notice: Subject to any disclaimer, the term of this patent is extended or adjusted under 35 U.S.C. 154(b) by 420 days.

(21) Appl. No.: 12/416,272

(22) Filed: Apr. 1, 2009

(65) Prior Publication Data

US 2010/0255880 A1    Oct. 7, 2010

(51) Int. Cl.
*H04M 1/00*   (2006.01)
(52) U.S. Cl. .................. 455/558; 455/553.1
(58) Field of Classification Search ............ 455/558, 455/436, 67.11, 416, 553.1, 550.1, 552.1, 455/422.1, 444, 551, 41.2, 556.1
See application file for complete search history.

(56) References Cited

U.S. PATENT DOCUMENTS

2008/0064443 A1   3/2008  Shin
2009/0291710 A1*  11/2009 Jheng et al. ............ 455/558

FOREIGN PATENT DOCUMENTS

CN    1960550 A    5/2007
CN   101141732 A   3/2008

OTHER PUBLICATIONS

English abstract of CN101141732A; pub. Mar. 12, 2008.
English abstract of CN1960550A; pub. May 9, 2007.
3GPP TS 24.072 V7.0.0 (Jun. 2007) 3rd Generation Partnership Project; Technical Specification Group Core Network; Call Deflection (CD) Supplementary Service; Stage 3 (Release 7).
3GPP TS 24.082 V7.1.0 (Sep. 2007) 3rd Generation Partnership Project; Technical Specification Group Core Network; Call Forwarding (CF) Supplementary Services; Stage 3 (Release 7).

* cited by examiner

*Primary Examiner* — Joseph Lauture
(74) *Attorney, Agent, or Firm* — Thomas|Kayden

(57) ABSTRACT

A communication apparatus is provided. A first subscriber identity card is with a first address and camps on a first cell. A second subscriber identity card is with a second address and camps on a second cell. After receiving a communication request requesting for establishing wireless communication between the first subscriber identity card and a peer communication entity, a processor activates a service instructing the second wireless network to transfer a future apparatus terminated communication request of the second subscriber identity card to the first subscriber identity card via the first cell.

21 Claims, 14 Drawing Sheets

US 8,064,957 B2

COMMUNICATION APPARATUSES FOR HANDLING APPARATUS TERMINATED OR ORIGINATED COMMUNICATION REQUESTS WITH INCREASED COMMUNICATION CAPABILITY AND METHODS THEREOF

BACKGROUND OF THE INVENTION

1. Field of the Invention

The invention relates to a method for handling an apparatus terminated or originated communication request in a communication apparatus, and more particularly to a method for handling an apparatus terminated or originated communication request in the communication apparatus with increased communication capability.

2. Description of the Related Art

The term "wireless", normally refers to an electrical or electronic operation, which is accomplished without the use of a "hard wired" connection. "Wireless communication", is the transfer of information over a distance without the use of electrical conductors or wires. The distances involved may be short (a few meters for television remote controls) or very long (thousands or even millions of kilometers for radio communications). The best known example of wireless communication is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and -defined cellular communication technologies. For example, the Global System for Mobile communications (GSM) is a well-defined and commonly adopted communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard, that uses code division multiple access (CDMA) technology. The UMTS (Universal Mobile Telecommunications System) is a 3G mobile communications system, which provides an enhanced range of multimedia services over the 2G GSM system. The Wireless Fidelity (Wi-Fi) is a technology defined by the 802.11b engineering standard and can be used for home networks, mobile phones, video games, to provide a high-frequency wireless local area network.

With the advanced development of wireless communication technologies, it is now possible to provide multiple wireless communication services using different or the same communication technologies in one communication apparatus. In order to increase the communication capability, methods for handling an apparatus terminated communication request in the communication apparatus with increased communication capability are highly required.

BRIEF SUMMARY OF THE INVENTION

Communication apparatuses are provided. An embodiment of a communication apparatus comprises a radio transceiver module, a first subscriber identity card, a second subscriber identity card and a processor. The first subscriber identity card with a first address camps on a first cell belonging to a first wireless network via the radio transceiver module. The second subscriber identity card with a second address camps on a second cell belonging to a second wireless network via the radio transceiver module. The processor is coupled to the radio transceiver module, the first subscriber identity card and the second subscriber identity card. After receiving a communication request requesting for establishing wireless communication between the first subscriber identity card and a peer communication entity, the processor activates a service instructing the second wireless network to transfer a future apparatus terminated communication request of the second subscriber identity card to the first subscriber identity card via the first cell Another embodiment of a communication apparatus comprises at least one radio transceiver module, a first subscriber identity card, a second subscriber identity card and a processor. The first subscriber identity card with a first address camps on a first cell belonging to a first wireless network via the radio transceiver module. The second subscriber identity card with a second address camps on a second cell belonging to a second wireless network via the radio transceiver module. The processor is coupled to the radio transceiver module, the first subscriber identity card and the second subscriber identity card, monitors a first signal quality of the first wireless network for the first subscriber identity card and a second signal quality of the second wireless network for the second subscriber identity card, and activates a service instructing the second wireless network to transfer a future apparatus terminated communication request of the corresponding second subscriber identity card to the first subscriber identity card via the first cell when determining that the second subscriber identity card is going to out of service according to the second signal quality.

Another embodiment of a communication apparatus comprises a first radio transceiver module, a second radio transceiver module, a first subscriber identity card, a second subscriber identity card a battery and a processor. The first subscriber identity card with a first address camps on a first cell belonging to a first wireless network via the first radio transceiver module. The second subscriber identity card with a second address camps on a second cell belonging to a second wireless network via the second radio transceiver module. The battery provides power to the first radio transceiver module and the second radio transceiver module. The processor is coupled to the battery, the first radio transceiver module, the second radio transceiver module, the first subscriber identity card and the second subscriber identity card, monitors an amount of remaining power of the battery, activates a service instructing the second wireless networks to transfer a future apparatus terminated communication request of the second subscriber identity card to the first subscriber identity card via the first cell and turns off the second radio transceiver module after determining a power low condition according to the amount of remaining power.

Another embodiment of a communication apparatus comprises a radio transceiver module, a first subscriber identity card, a second subscriber identity card, a battery and a processor. The first subscriber identity card with a first address camps on a first cell belonging to a first wireless network via the radio transceiver module. The second subscriber identity card with a second address camps on a second cell belonging to a second wireless network via the radio transceiver module. The battery provides power to the radio transceiver module. The processor is coupled to the battery, the radio transceiver module, the first subscriber identity card and the second subscriber identity card, monitors an amount of remaining power of the battery, and activating a service instructing the second wireless networks to transfer a future apparatus terminated communication request of the second subscriber identity card to the first subscriber identity card via the first cell and instructs the radio transceiver module not to listen to the second cell after determining a power low condition according to the amount of remaining power.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
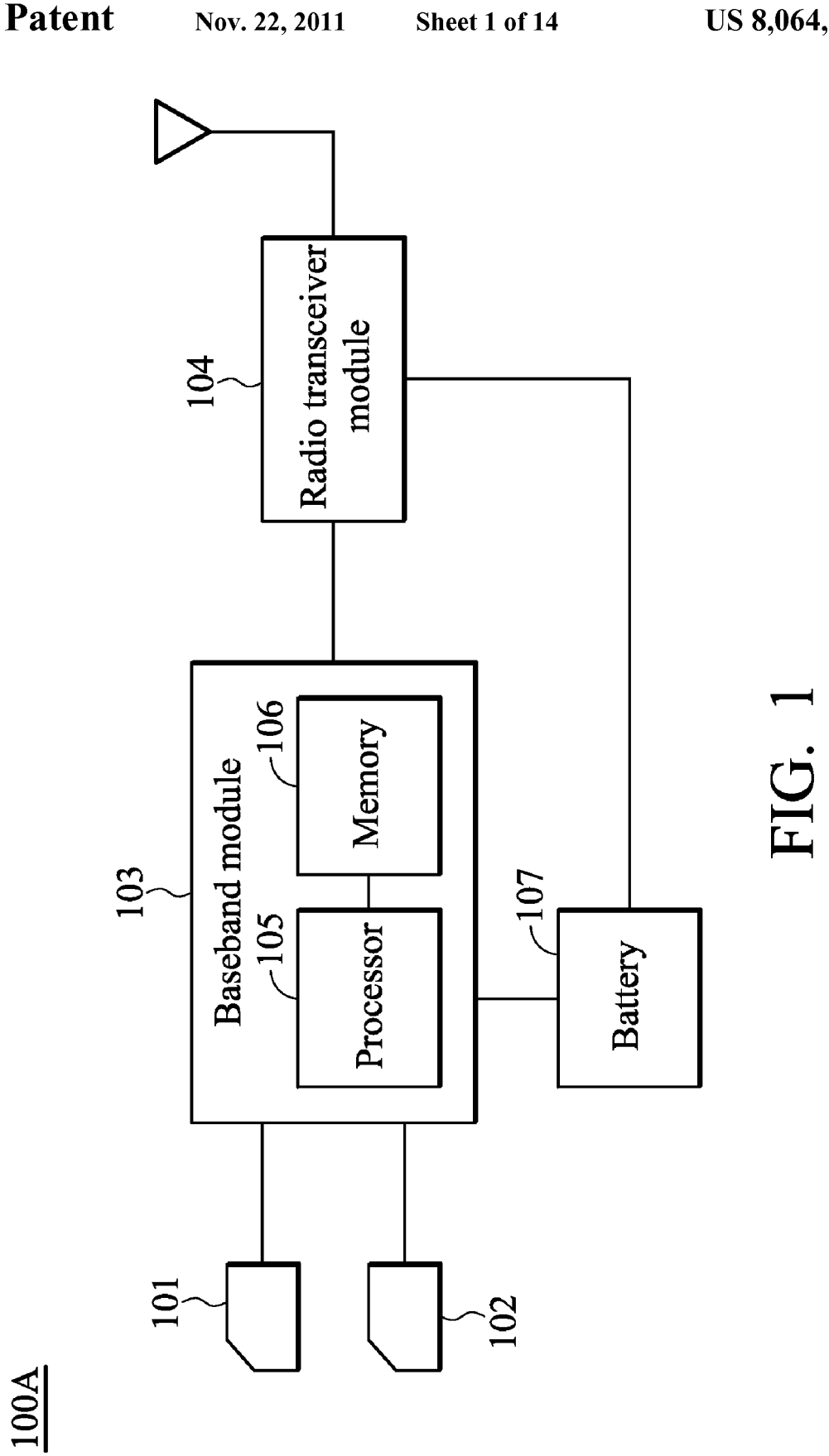
FIG. 1 shows a communication apparatus according to an embodiment of the invention.

FIG. 1 shows a communication apparatus according to an embodiment of the invention. As shown in FIG. 1, communication apparatus 100A comprises subscriber identity cards 101 and 102, a baseband module 103, a radio transceiver module 104, and a battery 107, wherein the baseband module 103 is coupled to the subscriber identity cards 101 and 102, and the radio transceiver module 104. The battery 107 is configured to provide power to the baseband module 103 and the radio transceiver module 104. The radio transceiver module 104 receives wireless radio frequency signals, converts the received signals to baseband signals to be processed by the baseband module 103, or receives baseband signals from the baseband module 103 and converts the received signals to wireless radio frequency signals to be transmitted to a peer device. The radio transceiver module 104 may comprise a plurality of hardware devices to perform radio frequency conversion. For example, the radio transceiver module 104 may comprise a mixer to multiply the baseband signals with a carrier oscillated in the radio frequency of the wireless communication system, wherein the radio frequency may be, for example, 900 MHz or 1800 MHz for a global system for mobile communication (GSM), or 1900 MHz for a Universal Mobile Telecommunications System (UMTS). The baseband module 103 further converts the baseband signals to a plurality of digital signals, and processes the digital signals, and vice versa. The baseband module 103 may also comprise a plurality of hardware devices to perform baseband signal processing. The baseband signal processing may comprise analog to digital conversion (ADC)/digital to analog conversion (DAC), gain adjustments, modulation/demodulation, encoding/decoding, and so on. The baseband module 103 further comprises a memory device 106 and a processor 105 for controlling the operations of the baseband module 103, the radio transceiver module 104, and the subscriber identity cards 101 and 102 plugged into two sockets, respectively. The processor 105 reads data from the plugged in subscriber identity cards 101 and 102 and writes data to the plugged in subscriber identity cards 101 and 102. It is to be noted that the memory device 106 may also be configured outside of the baseband module 103 and the invention should not be limited thereto.

Figure 2:
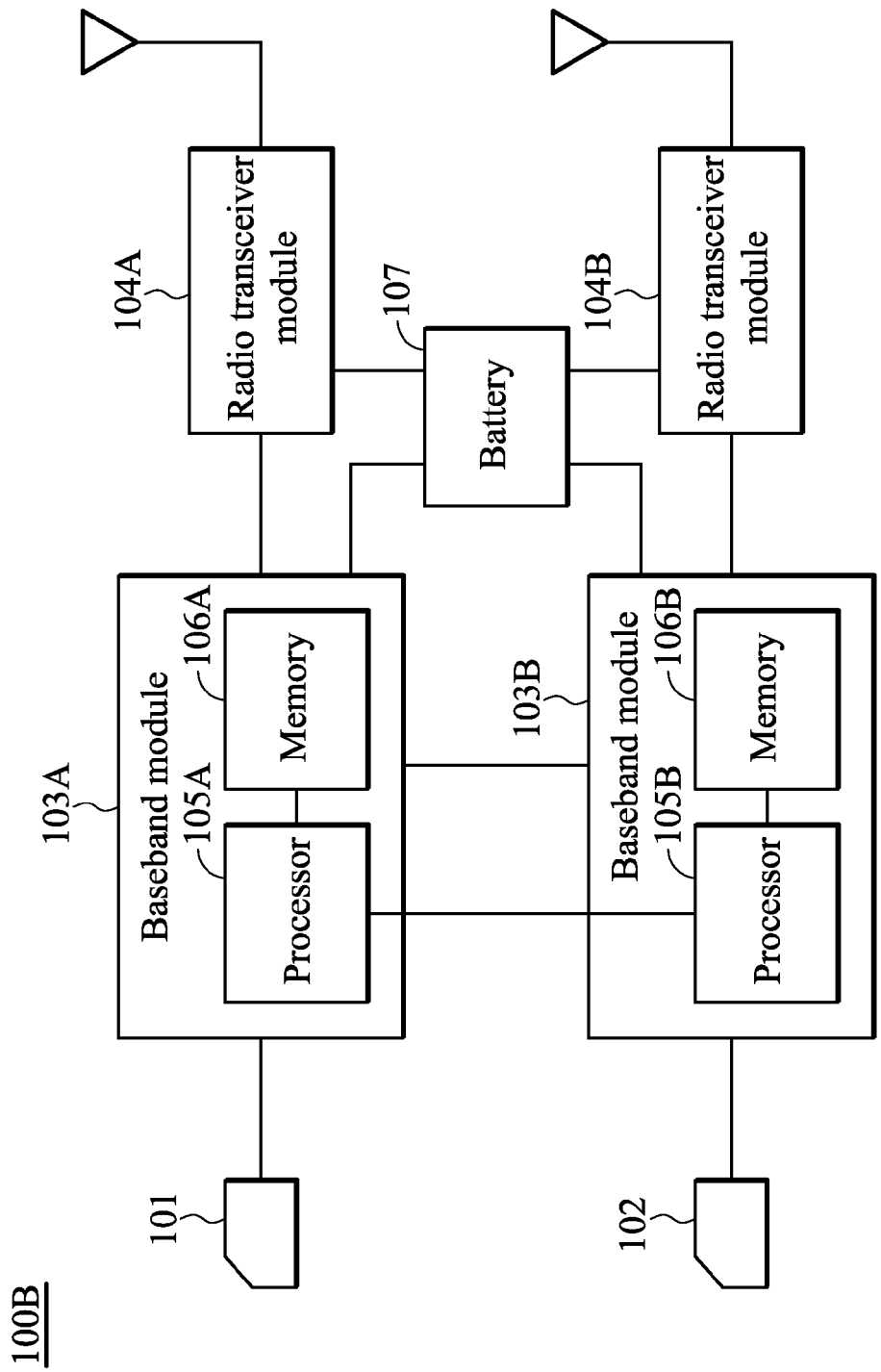
FIG. 2 shows a communication apparatus according to another embodiment of the invention.
Figure 3:
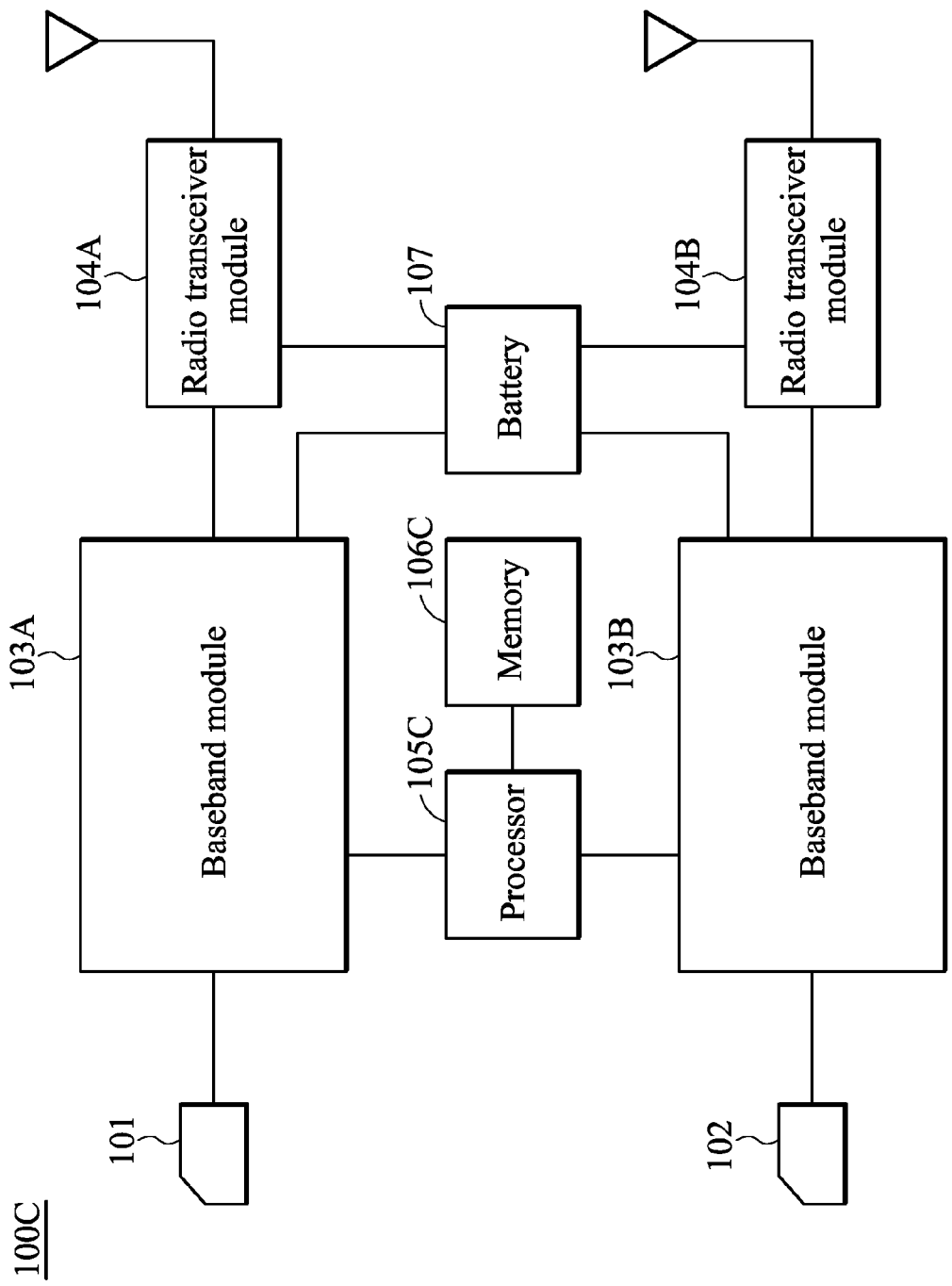
FIG. 3 shows a communication apparatus according to another embodiment of the invention.

According to another embodiment of the invention, the communication apparatus comprising more than one subscriber identity card, may also comprise more than one baseband module and radio transceiver module, respectively, for each subscriber identity card. FIG. 2 and FIG. 3 respectively show communication apparatuses according to another embodiments of the invention. As shown in FIG. 2 and FIG. 3, communication apparatus 100B comprises subscriber identity cards 101 and 102, baseband modules 103A and 103B, and radio transceiver modules 104A and 104B, wherein the baseband module 103A is coupled to the subscriber identity card 101 and the radio transceiver module 104A, and the baseband module 103B is coupled to the subscriber identity card 102 and the radio transceiver module 104B. The operations of the baseband modules 103A and 103B are similar with that of the baseband module 103 and are not described here for brevity. Similarly, the operations of the radio transceiver module 104A and 104B are similar with that of the radio transceiver module 104 and are not described here for brevity. It is noted that in FIG. 2, the baseband module 103A comprises a memory device 106A and a processor 105A for controlling the operations of the subscriber identity card 101, the baseband module 103A and the radio transceiver module 104A, and the baseband module 103B also comprises a memory device 106B and a processor 105B for controlling the operations of the subscriber identity card 102, the baseband module 103B and the radio transceiver module 104B. The processors 105A and 105B may be coupled and communicate with each other. The data stored in memory devices 106A and 106B may be shared and accessed by both of the processors 105A and 105B. For example, one of the processor may be a master processor and the other one may be a slave processor to cooperate with the master processor. As shown in FIG. 3, according to still another embodiment of the invention, the communication apparatus 100C may comprise one memory device 106C and one processor 105C for controlling the operations of the subscriber identity cards 101 and 102, the baseband modules 103A and 103B, and the radio transceiver modules 104A and 104B. The operations of the processor 105C are similar with that of the processor 105 and are not described here for brevity. The described processors 105, 105A, 105B and 105C may be general-purpose processors and when executing program code perform the mentioned control operations. The described memory 106, 106A, 106B and 106C may comprise at least one of read only memory (ROM), random access memory (RAM), NOR flash and NAND flash for storing program code and data.

Figure 4:
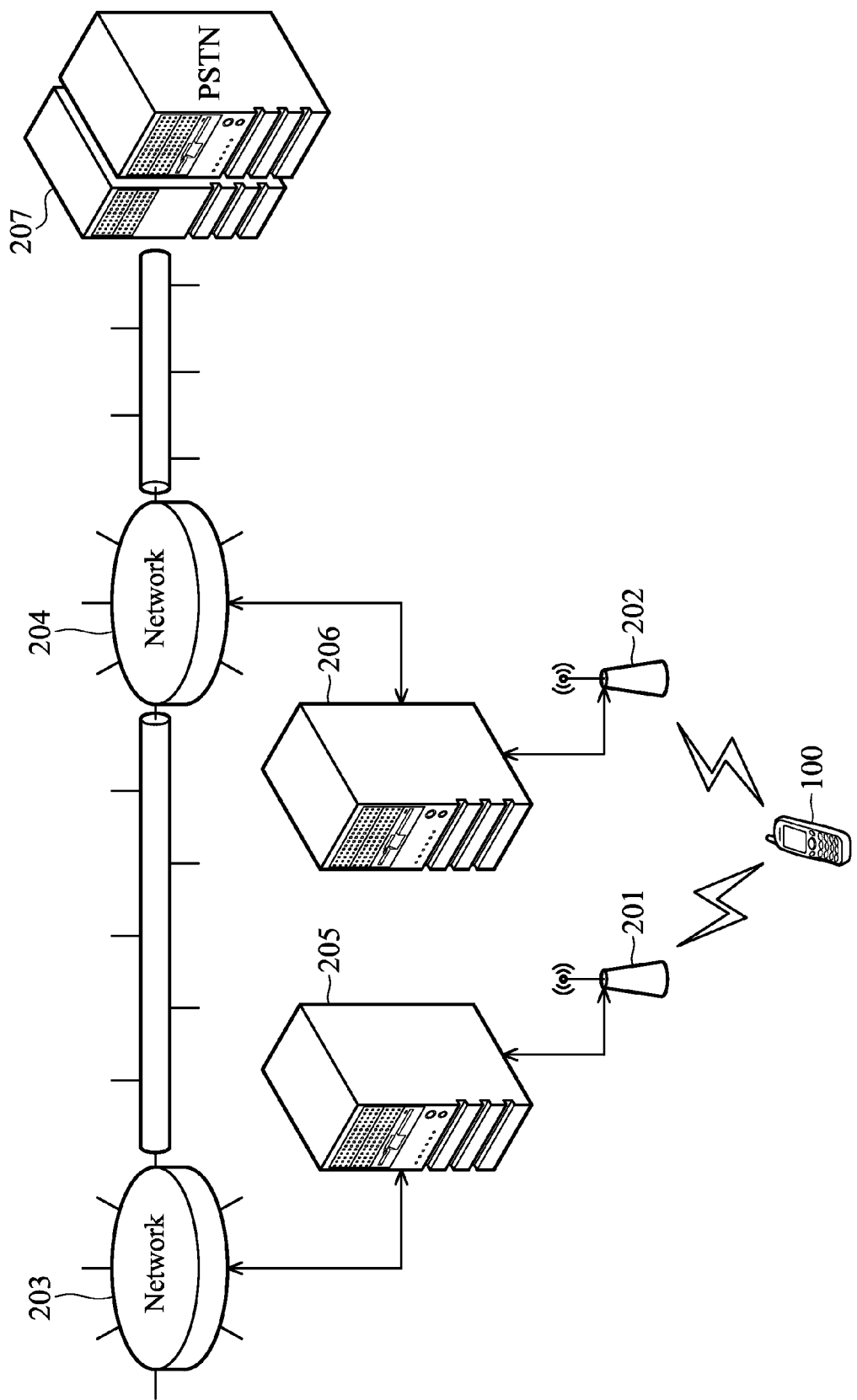
FIG. 4 shows an exemplary network topology according to an embodiment of the invention.

FIG. 4 shows an exemplary network topology according to an embodiment of the invention. The communication apparatus 100 shown in FIG. 4, may be the communication apparatuses 100A, 100B and 100C previously illustrated in FIG. 1 to FIG. 3. Thus, from hereinafter, the communication apparatus 100 will be used to represent all like previously described apparatuses for brevity. The communication apparatus 100, equipped with more than one subscriber identity card, may simultaneously access more than one network 203 and 204 of the same or different communication technologies, where the network 203 or 204 may be the GSM, WCDMA, Wi-Fi, CDMA2000 or Time Division-Synchronous Code Division Multiple Access (TD-SCDMA) network, or Internet, or the like, after camping on or associating with the cells managed by access stations 201 and 202, where the access station 201 or 202 may be a base station, a node-B, an access point compatible with 802.1a, 802.1b or 802.1g. The communication apparatus 100 may issue an apparatus originated communication request, also referred to as mobile originated (MO) call request, such as a voice call, a data call, a video call, or a voice over Internet Protocol (VOIP) call, to a called party (i.e. a destination peer communication entity with a destination address of another wired or wireless communication apparatus) through at least one of the networks 203 and 204 with corresponding intermediary apparatuses 205 and 206 (for example, the GSM network with a Mobile Switching Center (MSC), the WCDMA/TD-SCDMA network with a Radio Network Controller (RNC), or the Internet with a Session Initiation Protocol (SIP) server), or through the Public Switched Telephone Network (PSTN) 207 or any combinations thereof, by using any of the equipped subscriber identity cards. The address may be, as an example, a series of predetermined numbers directed to a specific subscriber identity card, such as an Internet Protocol (IP) address for a VOIP call or a phone number for a circuit switch call, or others. Moreover, the communication apparatus 100 may receive an apparatus terminated communication request, also referred to as mobile terminated (MT) call request, such as an incoming voice call, an incoming data call, an incoming video call, or an incoming voice over Internet Protocol (VOIP) call with any of the subscriber identity cards from a calling party (i.e. an origination peer communication entity with an origination address of another wired or wireless communication apparatus). The apparatus terminated communication request is a communication request initiated from a peer communication entity to request to establish wireless communication with a subscriber identity card of the communication apparatus 100. It is to be understood that there may be one or more gateways positioned between heterogeneous types of networks.

According to an embodiment of the invention, the subscriber identity cards 101 and 102 may relate to one type of wireless communication system. For example, the subscriber identity card 101 or 102 may be the subscriber identity module (SIM) card corresponding to the GSM system, or the universal subscriber identity module (USIM) card corresponding to the UMTS system, or the removable user identity module (RUIM) card or the CDMA Subscriber Identity Module (CSIM) card corresponding to the CDMA2000 communication system, or others. An SIM card typically contains user account information, an international mobile subscriber identity (IMSI) and a set of SIM application toolkit (SAT) commands and provides storage space for phone book contacts. The processor, such as processor 105, 105A, 105B or 105C, of the baseband module, such as baseband module 103, 103A or 103B, may interact with a micro control unit (MCU) of the SIM card to fetch data or SAT commands from the plugged in SIM card. The communication apparatus 100 is immediately programmed after being plugged into the SIM card. The SIM card may also be programmed to display custom menus for personalized services. The communication apparatus 100 may be plugged into an USIM card for UMTS (also called 3G) telephony communication. The USIM card stores user account information, IMSI, authentication information and a set of USIM Application Toolkit (USAT) commands and provides storage space for text messages and phone book contacts. The baseband processor 105, 105A, 105B or 105C may interact with an MCU of the USIM card to fetch data or SAT commands from the plugged in USIM card. The phone book on the USIM card is more enhanced than that on the SIM card. For authentication purposes, the USIM card may store a long-term preshared secret key K, which is shared with the Authentication Center (AuC) in the network. The USIM MCU may verify a sequence number, that may be within a range, by using a window mechanism to avoid replay attacks, and generates the session keys CK and IK to be used in the confidentiality and integrity algorithms of the KASUMI (also termed A5/3) block cipher in the UMTS system. The communication apparatus 100 is immediately programmed after being plugged into the USIM card. The IMSI is a unique number associated with a global system for mobile communication (GSM) or a universal mobile telecommunications system (UMTS) network user. The IMSI may be sent by the communication apparatus 100 to the GSM or UMTS network to acquire other details of the mobile user in the Home Location Register (HLR) or, as locally copied, in the Visitor Location Register (VLR). An IMSI is typically 15 digits long, but can be shorter. The first 3 digits are the Mobile Country Code (MCC), and the following digits, are the Mobile Network Code (MNC), which are either 2 digits (European standard) or 3 digits (North American standard). The remaining digits are the mobile subscriber identification number (MSIN) for the GSM or UMTS network user.

Figure 5:
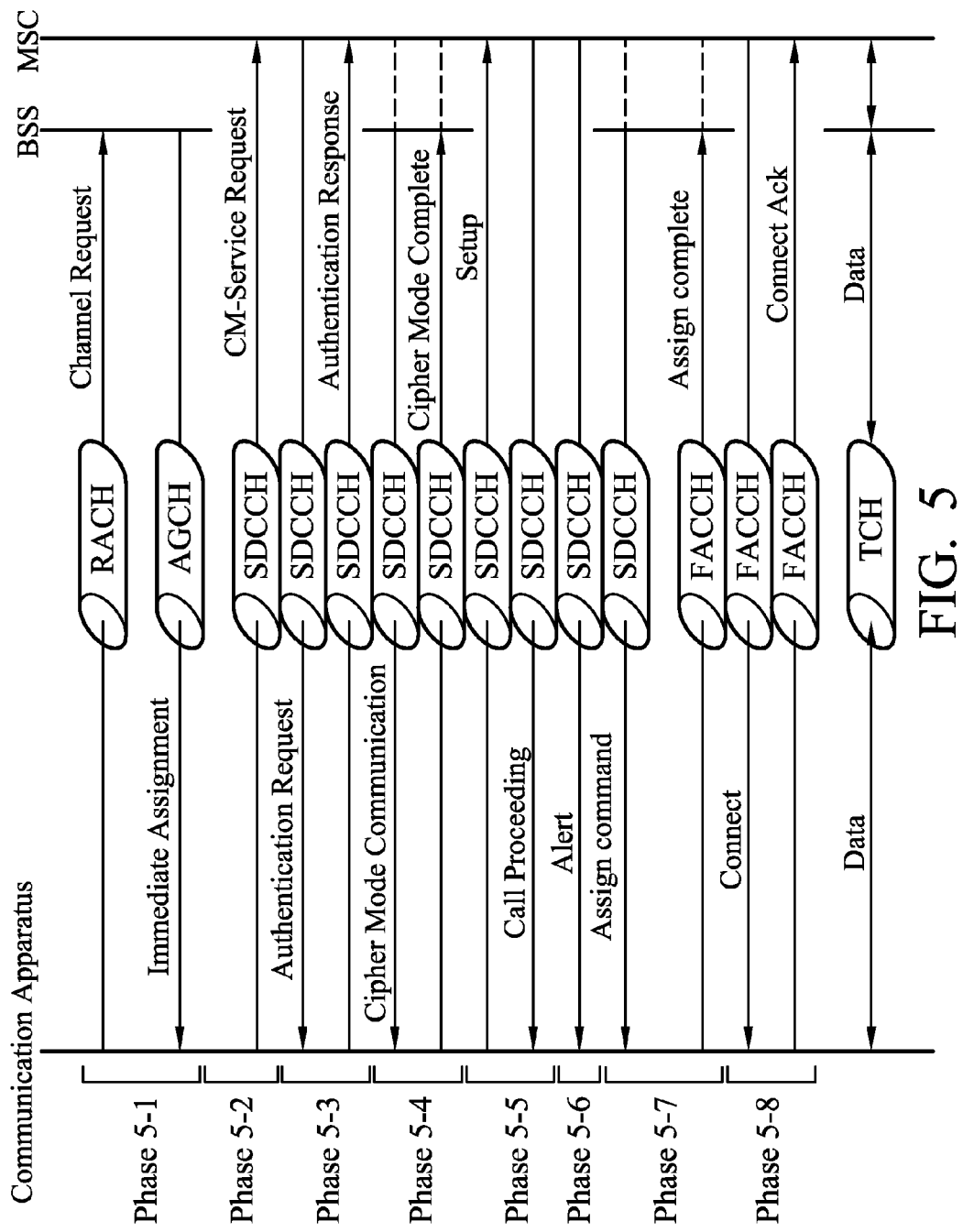
FIG. 5 shows logical channel assignments and signaling procedures of an apparatus originated communication request in a GSM system.

FIG. 5 shows exemplary logical channel assignments and signaling procedures of an apparatus originated communication request in GSM. In the GSM, a Call Control (CC), comprises procedures to establish, control, and terminate a communication service, and is an element of Connection Management (CM). When a user of the communication apparatus 100 plans to originate a communication service, such as a voice call service, the processor (105, 105A, 105C or 105C) receives a corresponding communication request from an upper layer (for example, from a man-machine interface (MMI) layer after the user operations). Then, the CC entity requests a Mobility Management (MM) connection from the local MM entity (Phase 5-1) via a Random Access Channel (RACH) to request a communication channel for the communication request. For a standard call, the communication apparatus 100 may need to register with the wireless network, whereas for an emergency call, registration is only optionally required. That is, an emergency call may be established on an unenciphered Radio Resource (RR) connection from a communication apparatus 100 that has not registered with the wireless network. The base station system (BSS) in the wireless network may assign a Stand-alone Dedicated Control Channel (SDCCH) or a Traffic Channel (TCH) via an Immediate Assignment carried in the Access Grant Channel (AGCH). After the process of sending out a CM-service request (Phase 5-2), authentication (Phase 5-3) and ciphering (Phase 5-4) with the MSC via the SDDCH is completed, an MM connection is established. After successful establishment of the MM connection and activation of the user data encryption, the service-requesting CC entity is informed. Thus, the signals on the connection desire to connect to the CC entity in the Mobile Switching Center MSC (SETUP). The MSC may respond to the connection request in several ways. The MSC may indicate with a message Call Proceeding (Phase 5-5) that the call request has been accepted and that all the necessary information for the setup of the call is available. Otherwise, the call request may be declined with a message Release Complete. Next, the communication apparatus 100 receives the Alert message (Phase 5-6) when the MSC is trying to connect to the called party. As soon as the called party receives the Alert message and accepts the call, the communication apparatus 100 receives an Assign Command and a dedicated channel will be assigned after the communication apparatus 100 responds to an Assignment Complete message via a Fast Associated Control Channel (FACCH) (Phase 5-7). The communication apparatus 100 next responds with a Connect Acknowledge message after receiving the Connect message from the MSC (Phase 5-8), and the traffic channel, successfully established on the TCH and the communication apparatus 100, may now begin to communicate with the called party. It is to be noted that the CC procedure of the WCDMA or TD-SCDMA system is similar to that of GSM system and is not further described for brevity.

Figure 6:
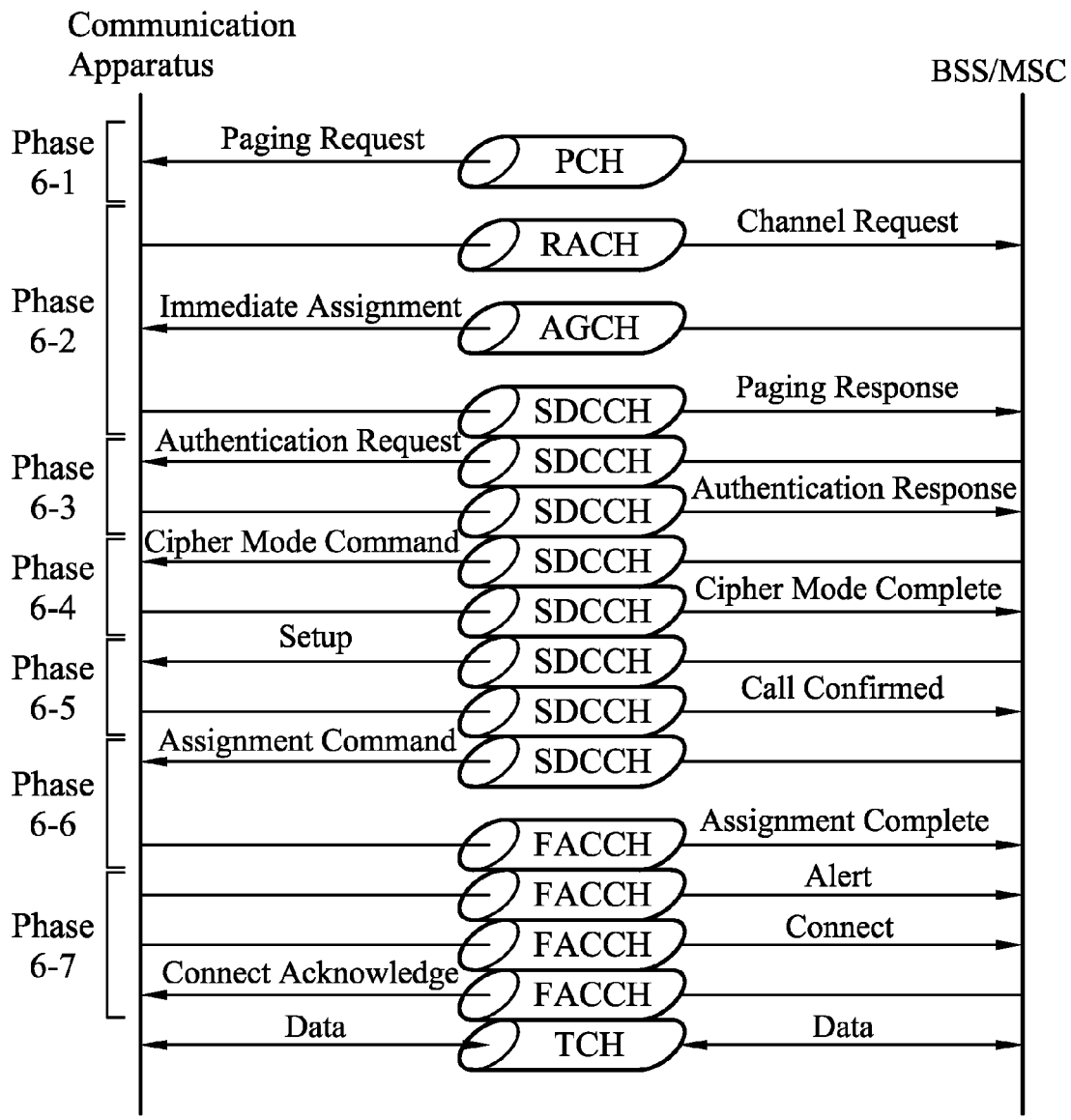
FIG. 6 shows logical channel assignments and signaling procedures of an apparatus terminated communication request in a GSM system.

FIG. 6 shows exemplary logical channel assignments and signaling procedures of an apparatus terminated communication request in a GSM system. When the communication apparatus 100 is being paged by a calling party, which means that the user of a peer wired or wireless communication apparatus is planning to originate a communication service with the communication apparatus 100, the Radio Resource (RR) entity first receives a Paging Request from the BSS/MSC via a Paging Channel (PCH) (Phase 6-1). The CC entity next requests a Mobility Management (MM) connection from the local MM entity via the Random Access Channel (RACH). The BSS in the wireless network may assign a Stand-alone Dedicated Control Channel (SDCCH) or a Traffic Channel (TCH) via an Immediate Assignment carried in the Access Grant Channel (AGCH), and the communication apparatus 100 responds with a Paging Response via the SDCCH to the BSS (Phase 6-2). After the process of authentication (Phase 6-3) and ciphering (Phase 6-4) with the MSC via the SDCCH is completed, an MM connection is established. After successful establishment of the MM connection and activation of the user data encryption, the CC entity is informed by a Setup message from the MSC, and responds with a Call Confirmed message to the MSC (Phase 6-5). The communication apparatus 100 next receives an Assignment Command which indicates the allowance of assigning a dedicated channel (Phase 6-6), and the dedicated channel will be assigned after the communication apparatus 100 responds to an Assign Complete message, an Alert message, and a Connect message via a Fast Associated Control Channel (FACCH). As soon as the communication apparatus 100 receives the Connect Acknowledge message from the MSC (Phase 6-7), the dedicated channel is successfully established on the TCH and the communication apparatus 100, may now begin to communicate with the calling party. It is to be noted that the CC procedure of the WCDMA or TD-SCDMA communication system is similar to that of the GSM communication system and is not further described for brevity.

According to embodiments of the invention, methods for handling an apparatus terminated or originated communication request (may also called mobile terminated or originated call request; MT or MO call request) with increased communication capability in a communication apparatus, such as 100A, 100B, 100C or 100 previously described, will be described in the following. In the following disclosure, the subscriber identity card 101 is with an address, hereinafter called $CN_A$ for brevity, and camps on a cell, hereinafter called $Cell_A$ for brevity, belonging to a wireless network, hereinafter called $NW_A$ for brevity, via the radio transceiver module 104 or 104A. Similarly, the subscriber identity card 102 is with an address, hereinafter called $CN_B$ for brevity, and camps on a cell, hereinafter called $Cell_B$ for brevity, belonging to a wireless network, hereinafter called $NW_B$ for brevity, via the radio transceiver module 104 or 104B. It is noted that cells $Cell_A$ and $Cell_B$ may be the same or different cells belonging to the same or different wireless networks $NW_A$ and $NW_B$ of the same or different communication technologies, and the invention should not be limited thereto.

According to a first embodiment of the invention, referring to the communication apparatus 100A shown in FIG. 1, equipped with only one radio transceiver module 104 shared between two or more subscriber identity cards. Note that, during a communication session for one subscriber identity card, the transceiver module 104 is occupied by the subscriber identity card, and the processor 105 is incapable of listening to any communication request from a cell that another subscriber identity card camps on. In order to increase the communication capability of the communication apparatus 100A, when detecting that a communication request of one subscriber identity card (for example, 101) has been received or triggered, the processor may activate a service instructing the wireless network corresponding to another subscriber identity card (for example, 102) to transfer all subsequently incoming communication request(s) of another subscriber identity card (102) to the subscriber identity card (101), for example, MT call requests. The communication request may be an MT call request and received from the cell that the subscriber identity card (101) camps on, or may be an MO call request and triggered by an internal software/hardware module corresponding to the subscriber identity card (101). As a result, the communication request originally to another subscriber identity card (102) will be transferred to the subscriber identity card (101) and may be answered by a user.

Figure 7:
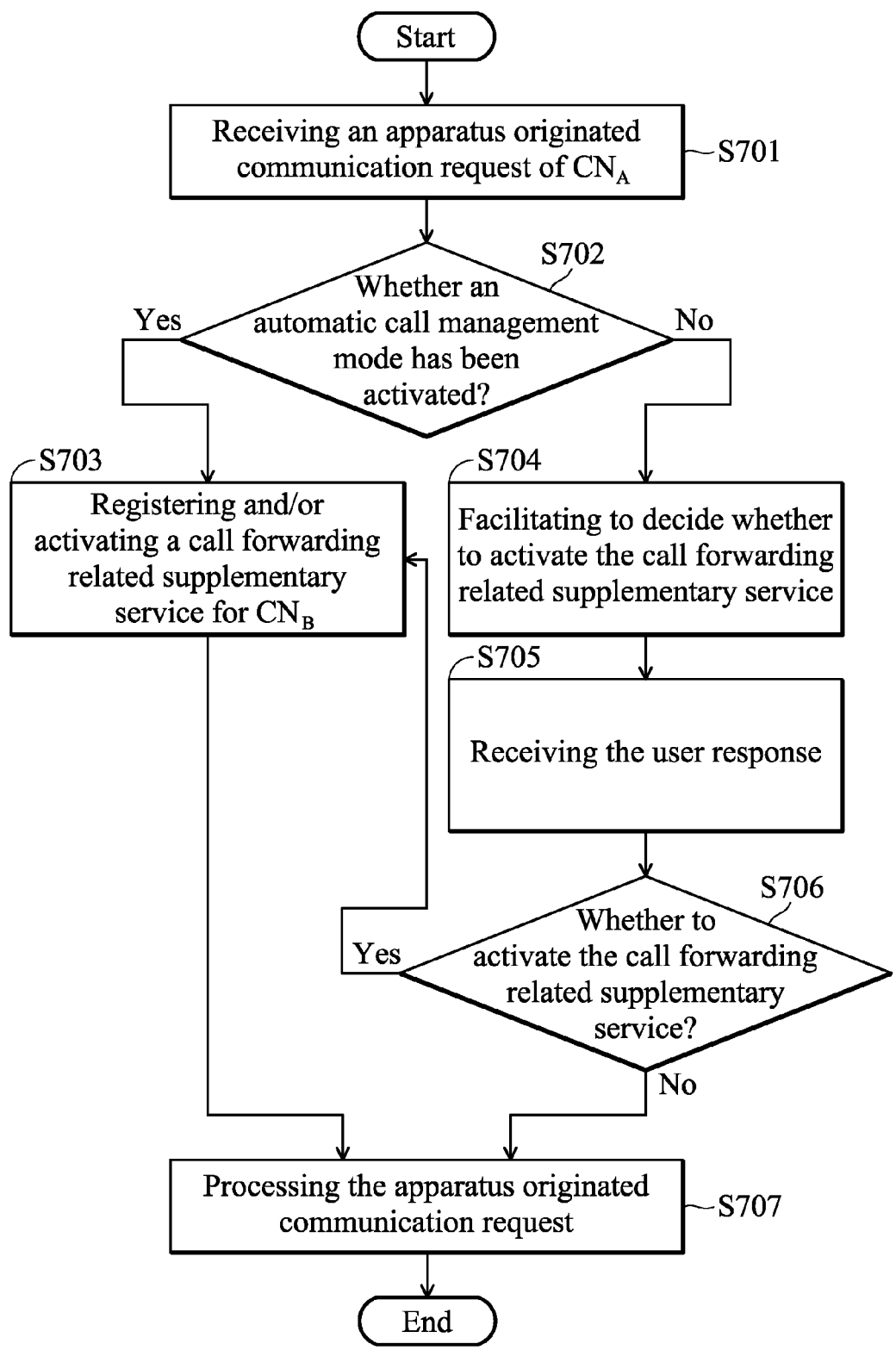
FIG. 7 shows a flow chart of the method for increasing communication capability of the communication apparatus according to a first embodiment of the invention.

FIG. 7 shows a flow chart of the method for increasing communication capability of the communication apparatus according to the first embodiment of the invention. After the processor receives an apparatus originated communication request, initiated by an user, to request for establishing a wireless communication with a peer communication entity via one of the subscriber identity cards (for example, $CN_A$) (Step S701), the processor determines whether an automatic call management mode has been activated (Step S702). The apparatus originated communication request may be received, as an example, from an upper layer when the user operates man-machine interface (MMI) of the communication apparatus 100A. The automatic call management mode may be activated or deactivated in advance via the MMI. The MMI is the means by which users interact with the communication apparatus. The MMI may contain screen menus, icons, keyboard shortcuts, command language, online help, physical buttons, key pad, touch screen, dials, levers or any combinations thereof. By using input devices of the MMI, users may manually touch, press, click, grasp or move the input devices to operate the communication apparatus. When the automatic call management mode has been activated, the processor registers and/or activates a call forwarding related supplementary service by transmitting a corresponding transfer request with the address of $CN_A$ (as the forwarding destination) to the cell $Cell_B$ that the subscriber identity card $CN_B$ camps on, so as to request the wireless network $NW_B$ to forward all subsequently incoming apparatus terminated communication request(s) of the subscriber identity card $CN_B$ to the subscriber identity card $CN_A$ (Step S703). Note that, while the subscriber identity card $CN_A$ communicates with the peer communication entity, the user can be informed that an apparatus terminated communication request originally to the subscriber identity card $CN_B$ is coming. Thereafter, the user may decide to hold the active call and answer the newly coming apparatus terminated communication request. On the other hand, when the automatic call management mode is not been activated, the processor may prompt the user to decide whether to activate the call forwarding related supplementary service with the MMI (Step S704). After receiving the user response (Step S705), the processor obtains the decision and determines whether to activate the call forwarding related supplementary service accordingly (Step S706). If so, the procedure goes to step S703, otherwise, to step S707. Finally, irrelevant to whether the call forwarding related supplementary service is activated or not, the processor continues to process the apparatus originated communication request (Step S707). The signallings for processing the apparatus originated communication request may refer to the previously described procedures shown in FIG. 5.

According to an embodiment of the invention, the transfer request for activating the call forwarding related supplementary service may be transmitted and acknowledged before transmitting a channel request message (such as phase 5-1 of FIG. 5) to avoid the transfer request failure to be sent out because of the radio resource occupancy for the MO call to be made. The call forwarding related supplementary service may be some predetermined call forwarding services provided by operators of the wireless networks, for example, a call forwarding unconditional (CFU) service or a call forwarding on mobile subscriber not reachable (CFNRc) service. As an example, the transfer request of the Call Forwarding Unconditional (CFU) supplementary service, with a destination address of the subscriber identity card $CN_A$, may instruct the wireless network $NW_B$ to forward apparatus terminated communication requests of the subscriber identity card $CN_B$ to the subscriber identity card $CN_A$ via $Cell_A$ rather than to the subscriber identity card $CN_B$ via $Cell_B$. The transfer request may contain at least a supplementary service registration and/or activation request to register and/or activate the call forwarding related supplementary service. In other words, during registration and activation of the CFU service, all apparatus terminated communication requests will not be delivered to the subscriber identity card $CN_B$ via $Cell_B$, but forwarded to $CN_A$ via $Cell_A$. Moreover, during registration and activation of the CFU service, a ForwardedToNumber which may be accompanied with a ForwardedToSubAddress, and information regarding all apparatus terminated communication requests or that of a specific basic service that should be forwarded are to be registered in the network. The basic services contain various circuit-switched services. For example, the basic service may be a speech call service (TS_TELEPHONY=0x11), a data call or short message service (TS_SHORTMESSAGEMT_PP=0x21 or TS_SHORTMESSAGEMO_PP=0x22), a facsimile call service (TS_FACSIMILEGROUP3ANDALTERSPEECH=0x61) or others.

Figure 11:
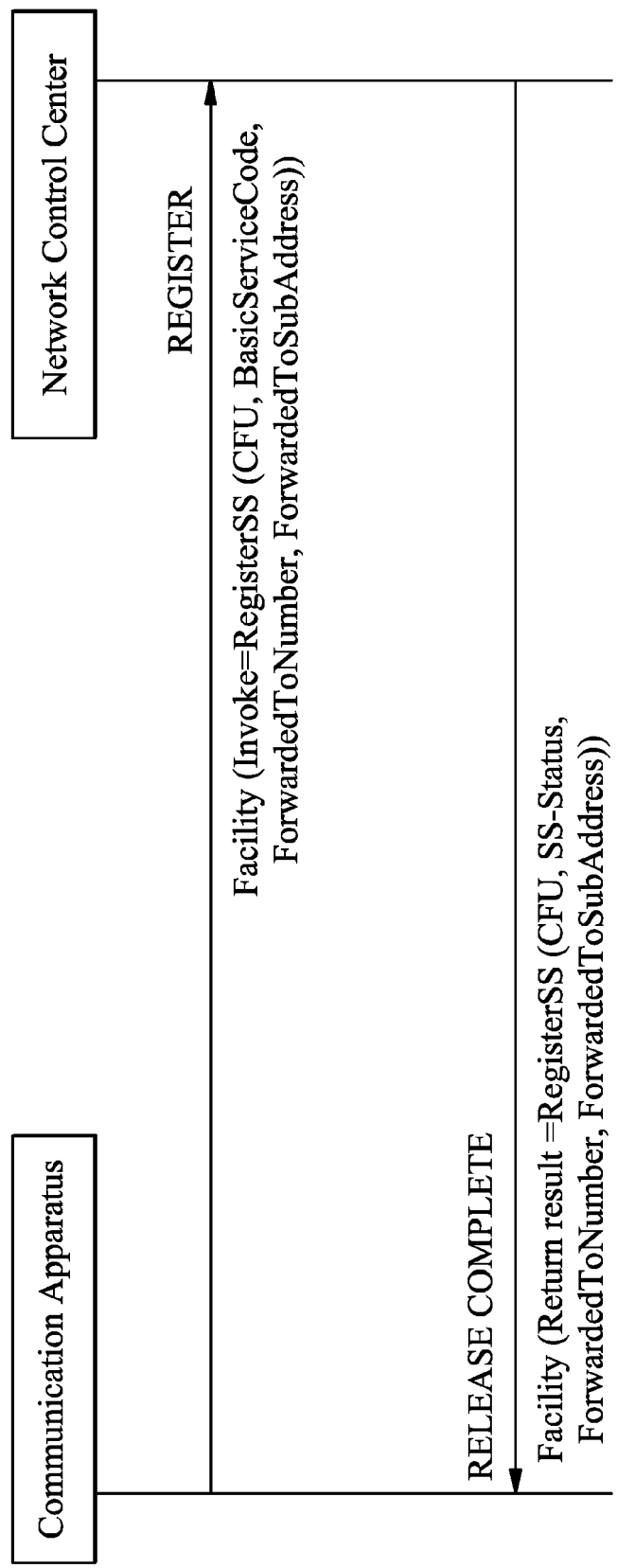
FIG. 11 shows the CFU registration procedure initialized by the communication apparatus according to an embodiment of the invention.
Figure 12:
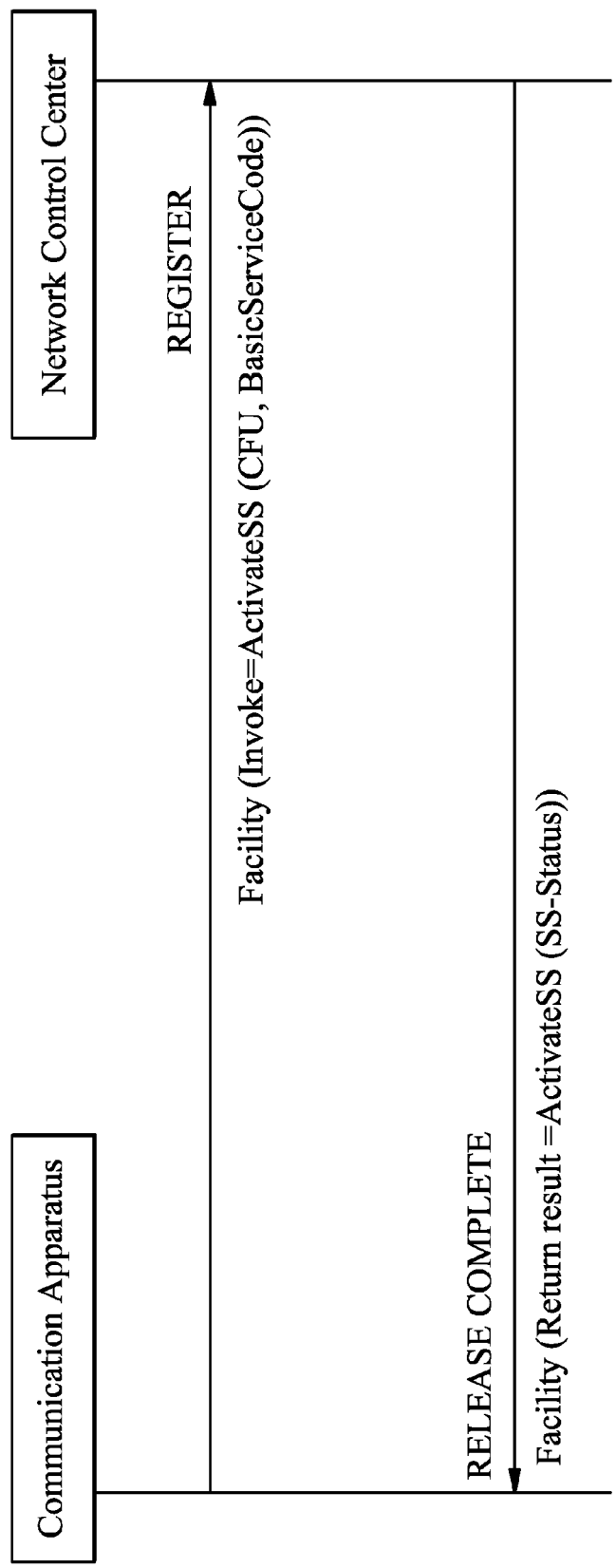
FIG. 12 shows an explicit CFU activation procedure initialized by the communication apparatus according to an embodiment of the invention.

FIG. 11 shows the CFU registration procedure initialized by the communication apparatus 100, 100A, 100B or 100C according to an embodiment of the invention. An CFU registration request transmitted by the communication apparatus 100, 100A, 100B or 100C includes an SS-Code (Supplementary Service-Code) of the forwarding service to be registered and possibly the BasicServiceCode in which the requested forwarding service applies to. If the BasicServiceCode is not included, the requested forwarding service will apply to all basic services. If the registration is successful, the CFU service is registered and activated. The network control center, such as an MSC, subsequently sends a return result indicating acceptance of the request including the ForwardedToNumber and possibly the BasicService (group) Code to which the CFU service is registered. FIG. 12 shows an explicit CFU activation procedure initialized by the communication apparatus 100, 100A, 100B or 100C according to an embodiment of the invention. An explicit CFU activation request transmitted by the communication apparatus 100, 100A, 100B or 100C contains the supplementary service to be activated and possibly the basic service group in which the requested supplementary service applies to. If a basic service group is not included in the activation request the requested supplementary service will apply to all basic services which a CFU forwarded-to number is registered.

Figure 13:
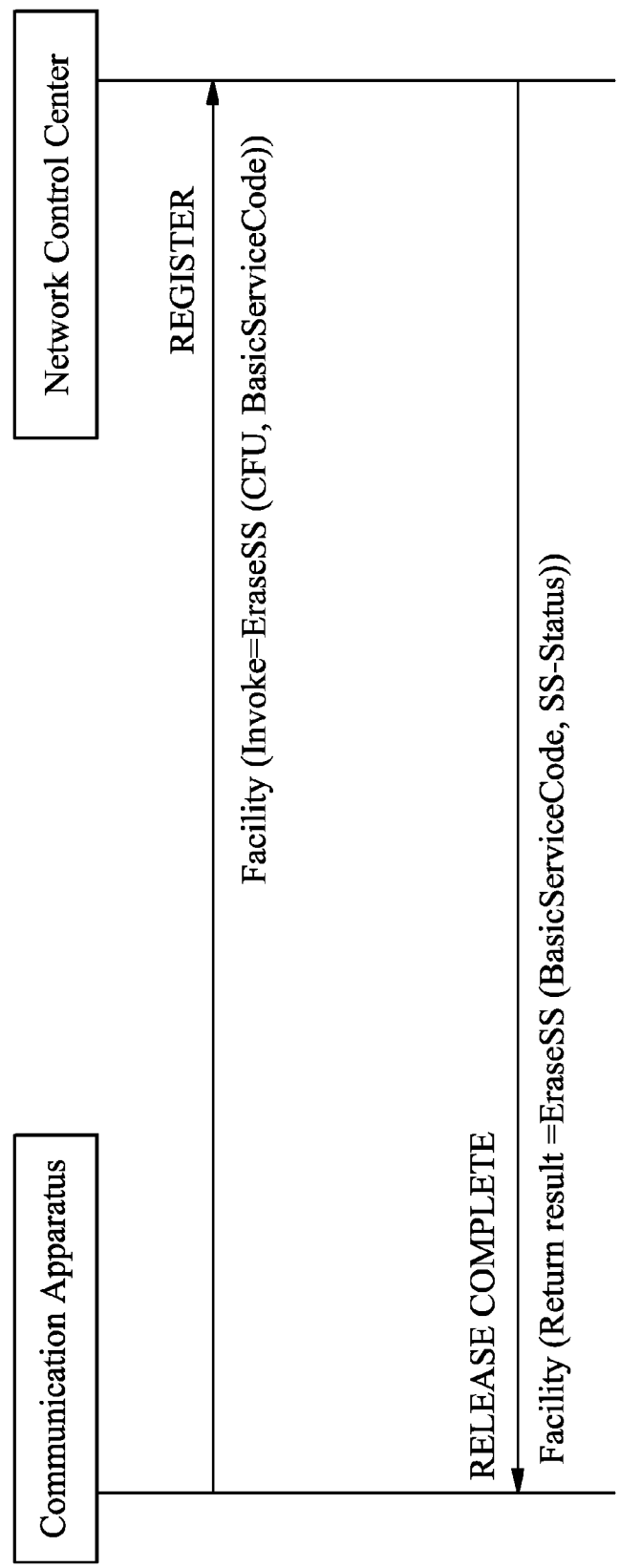
FIG. 13 shows an erasing registered CFU service procedure initialized by the communication apparatus according to an embodiment of the invention.
Figure 14:
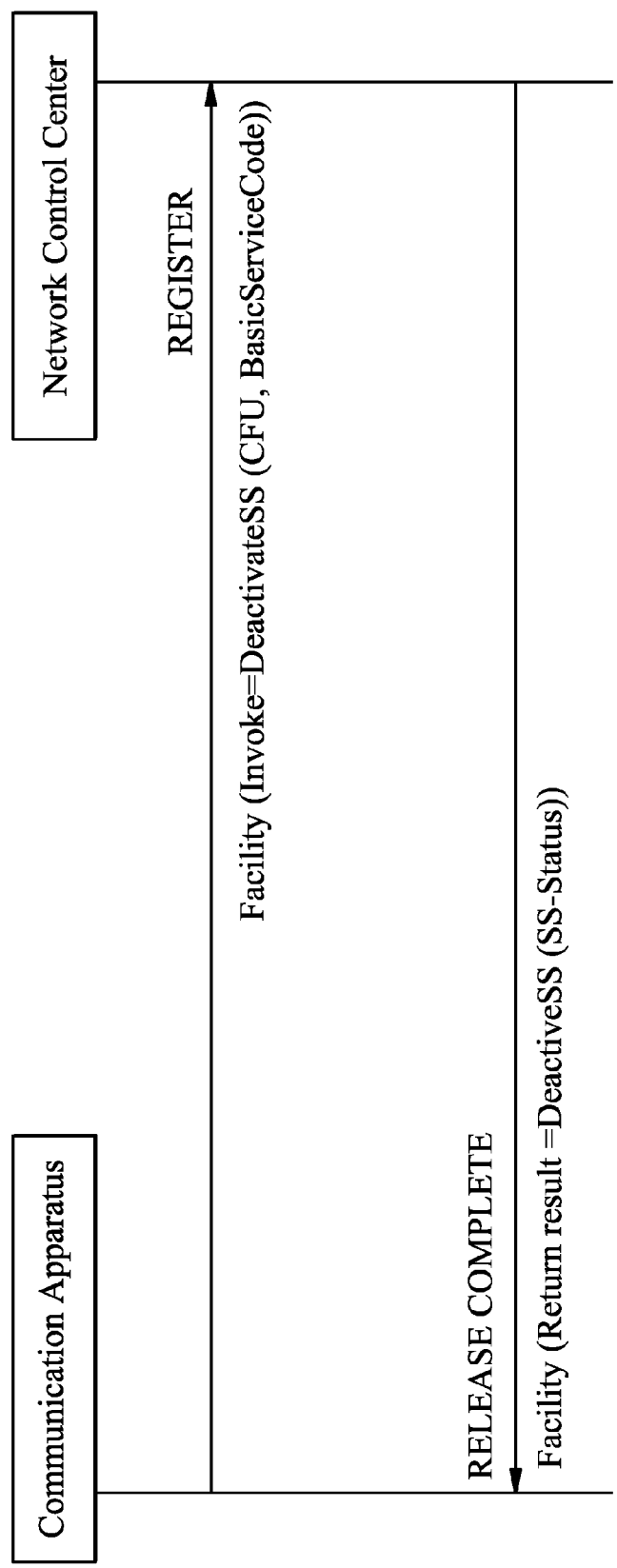
FIG. 14 shows an explicit CFU deactivation procedure initialized by the communication apparatus according to an embodiment of the invention.

According to the embodiment of the invention, referring back to FIG. 7, after the communication established in step S707 has been terminated, the activated call forwarding related supplementary service may be further deactivated or erased. FIG. 13 shows a CFU service erasing procedure initialized by the communication apparatus 100, 100A, 100B or 100C according to an embodiment of the invention. When the erasure is successful, the CFU service will be erased (and automatically deactivated). The network control center then sends a return result indicating acceptance of the request. The return result may include the BasicService (group) Code for which kind of basic service the CFU was erased and an SS-Status (Supplementary Service-Status) parameter. If the return request does not include a BasicServiceCode, it means that the erasure was successful for all basic services. FIG. 14 shows an explicit CFU deactivation procedure initialized by the communication apparatus 100, 100A, 100B or 100C according to an embodiment of the invention. An explicit CFU deactivation request contains the supplementary service to be deactivated and possibly the basic service group in which the requested supplementary service applies to. If a basic group is not included in the deactivation request, the request applies to all basic services which the CFU is activated. Next, the communication apparatus 100, 100A, 100B or 100C receives notification acceptance of the CFU deactivation request.

Figure 8:
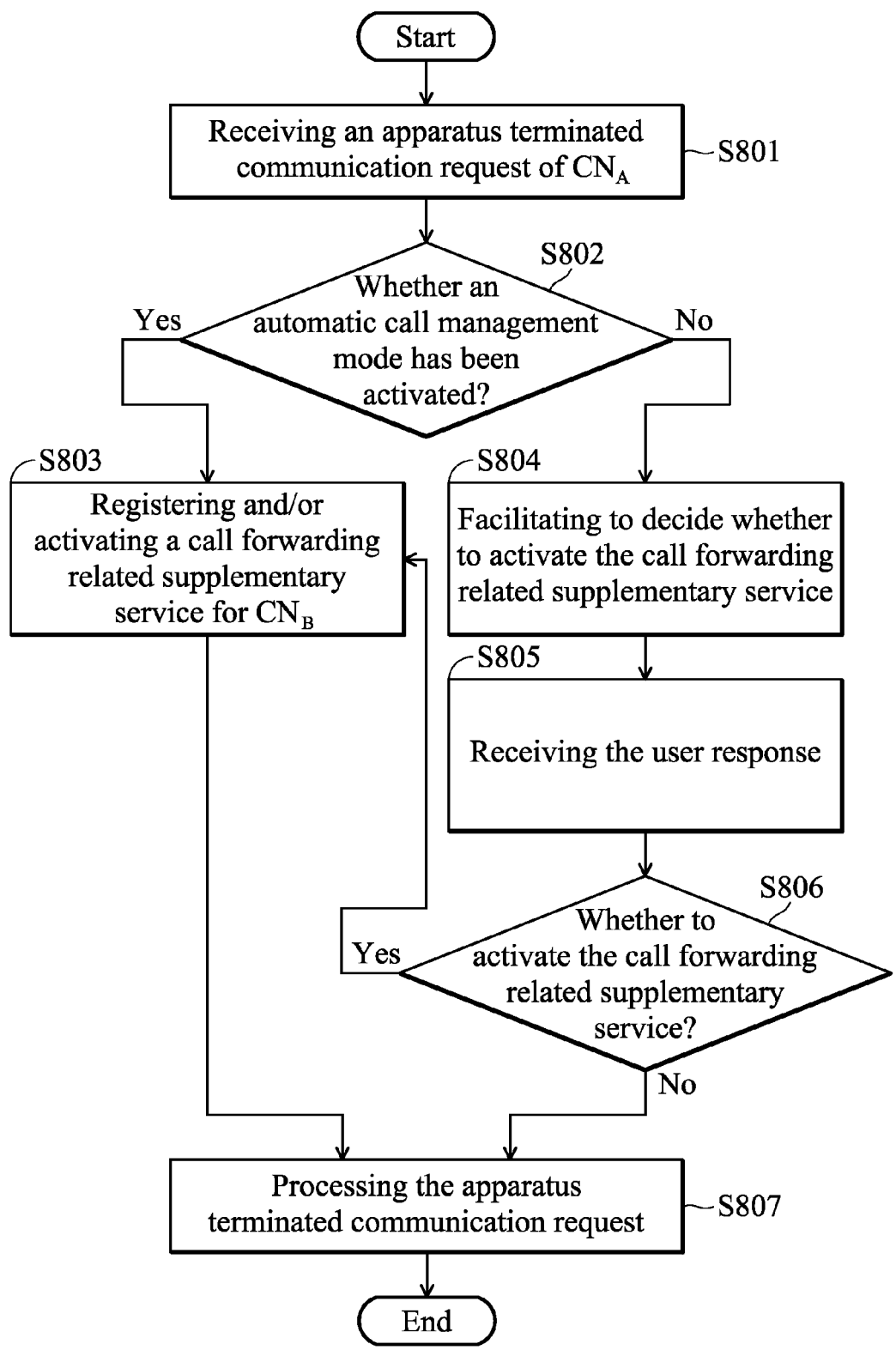
FIG. 8 shows another flow chart of the method for increasing communication capability of the communication apparatus according to the first embodiment of the invention.

FIG. 8 shows another flow chart of the method for increasing communication capability of the communication apparatus according to the first embodiment of the invention. After the processor receives an apparatus terminated communication request via $Cell_A$ initiated from a peer communication entity to request for establishing wireless communication with the subscriber identity card $CN_A$ (Step S801), such as the paging request shown in Phase 6-1 of FIG. 6, the processor determines whether an automatic call management mode has been activated (Step S802). As previously described, the automatic call management mode may be activated or deactivated by the user in advance via the MMI. When the automatic call management mode has been activated, the processor registers and/or activates a call forwarding related supplementary service by transmitting a corresponding transfer request with the address of subscriber identity card $CN_A$ (as the forwarding destination) to the cell $Cell_B$ that the subscriber identity card $CN_B$ camps on, so as to request the wireless network $NW_B$ to forward all subsequently incoming apparatus terminated communication request(s) of the subscriber identity card $CN_B$ to the subscriber identity card $CN_A$ (Step S803). Note that, while the subscriber identity card $CN_A$ communicates with the peer communication entity, the user can still be informed that an apparatus terminated communication request originally to the subscriber identity card $CN_B$ is coming. Thereafter, the user may decide to hold the active call and answer the newly coming apparatus terminated communication request. On the other hand, when the automatic call management mode is not been activated, the processor may prompt the user to decide whether to activate the call forwarding related supplementary service with the MMI (Step S804). After receiving the user response (Step S805), the processor obtains the decision and determines whether to activate the call forwarding related supplementary service accordingly (Step S806). If so, the procedure goes to step S803, otherwise, to step S807. Finally, irrelevant to whether the call forwarding related supplementary service is activated or not, the processor continues to process the apparatus terminated communication request (Step S807). The signallings for processing the apparatus terminated communication request may refer to the previously described procedures shown in FIG. 6.

According to an embodiment of the invention, the transfer request for activating the call forwarding related supplementary service may be transmitted before transmitting a paging response message to the wireless network to acknowledge reception of the apparatus terminated communication request (such as phase 6-2 of FIG. 6) to avoid the transfer request failure to be sent out because of the radio resource occupancy for the MT call to be answered. The call forwarding related supplementary service may be, as previously described, some predetermined call forwarding services provided by operators of the wireless networks, for example, a call forwarding unconditional (CFU) service or a call forwarding on mobile subscriber not reachable (CFNRc) service. Detailed registration and activation descriptions may be made to FIG. 11 and FIG. 12 with corresponding paragraphs. Thus, redundant descriptions are omitted here for brevity. Additionally, according to the embodiment of the invention, referring back to FIG. 8, after the communication established in step S807 has been terminated, the activated call forwarding related supplementary service may be further deactivated or erased. Detailed deactivation and erasure descriptions may be made to FIG. 13 and FIG. 14 with corresponding paragraphs. Thus, redundant descriptions are omitted here for brevity.

According to a second embodiment of the invention, referring to the communication apparatus 100A, 100B and 100C shown in FIG. 1, FIG. 2 and FIG. 3, in order to increase the communication capability, the processor (e.g. 105, 105A, 105B and/or 105C) monitors the signal qualities of the wireless networks $NW_A$ and $NW_B$ respectively for subscriber identity cards $CN_A$ and $CN_B$, and determines whether to activate a service enabling one of the wireless networks $NW_A$ and $NW_B$ to transfer a communication request of the corresponding subscriber identity card $CN_A$ or $CN_B$ to another subscriber identity card according to the signal qualities.

Figure 9:
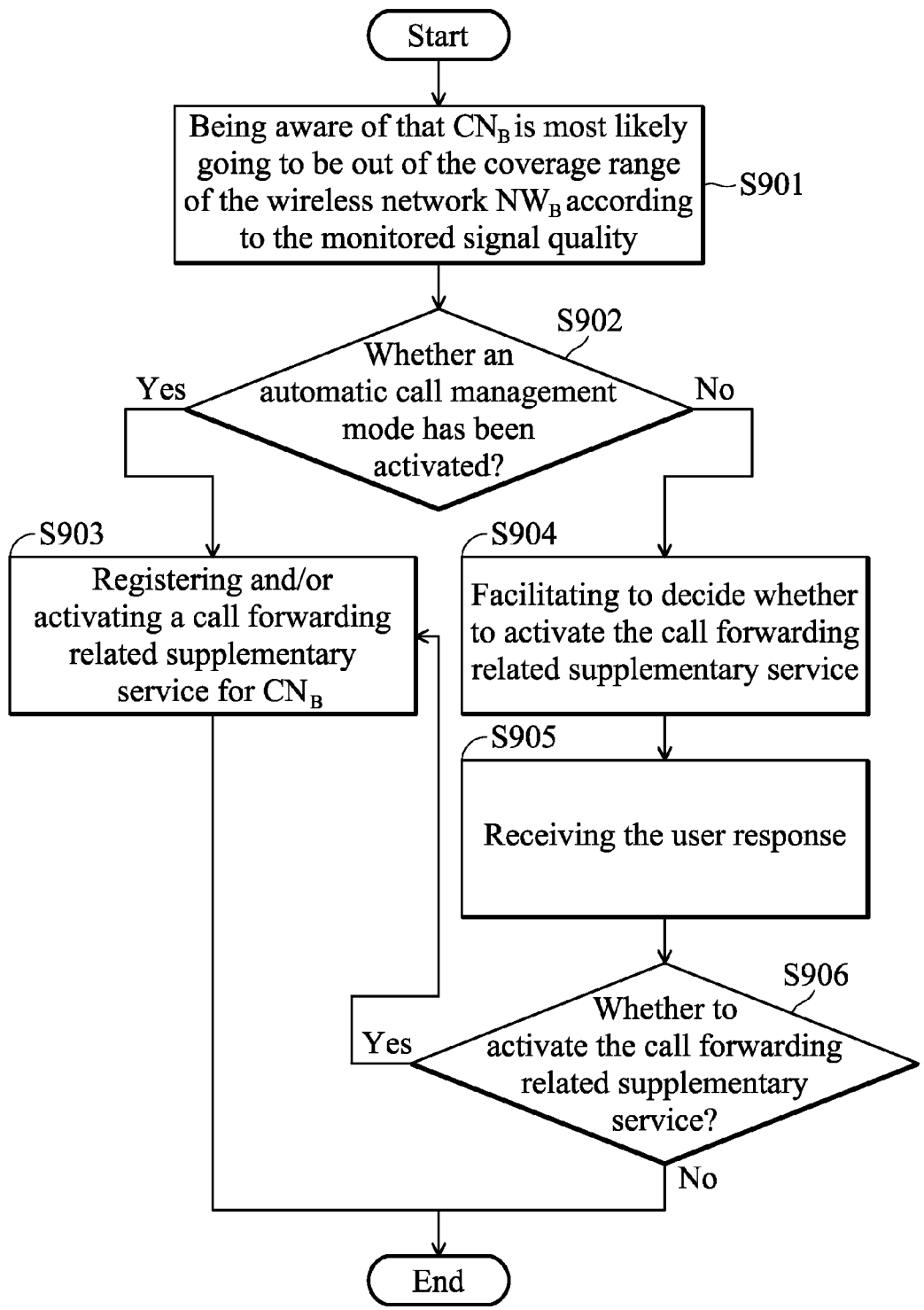
FIG. 9 shows a flow chart of the method for increasing communication capability of the communication apparatus according to a second embodiment of the invention.

FIG. 9 shows a flow chart of the method for increasing communication capability of the communication apparatus according to the second embodiment of the invention. When the processor determines that one of the subscriber identity cards (for example, $CN_B$) is most likely going to be out of the coverage range of the corresponding wireless network (for example, $NW_B$) according to the monitored signal quality (Step S901), the processor determines whether an automatic call management mode has been activated (Step S902). As previously described, the automatic call management mode may be activated or deactivated by the user in advance via the MMI. When the automatic call management mode has been activated, the processor registers and/or activates a call forwarding related supplementary service, by transmitting a corresponding transfer request with the address of subscriber identity card $CN_A$ (as the forwarding destination) to the cell $Cell_B$ that the subscriber identity card $CN_B$ camps on, so as to request the wireless network $NW_B$ to forward all subsequently incoming apparatus terminated communication request(s) of the subscriber identity card $CN_B$ to the subscriber identity card $CN_A$ (Step S903). Note that, even if the subscriber identity card $CN_B$ is out of the coverage range of the wireless network $NW_B$, the user can be informed that an apparatus terminated communication request originally to the subscriber identity card $CN_B$ is coming via the in-service subscriber identity card $CN_A$. Thereafter, the user may decide to answer the apparatus terminated communication request. On the other hand, when the automatic call management mode is not been activated, the processor may prompt the user to decide whether to activate the call forwarding related supplementary service with the MMI (Step S904), for example, showing a prompt message "The call forwarding service has not been started yet, want to activate it?", and two buttons captioned "YES" and "NO" on a display device thereof, and waiting for pressing or touching signals corresponding to the displayed buttons. After receiving the user response (Step S905), the processor obtains the decision and determines whether to activate the call forwarding related supplementary service accordingly (Step S906). If so, the procedure goes to step S903. Otherwise, the procedure ends.

According to an embodiment of the invention, the processor determines that one subscriber identity card is going to be out of the coverage range of the corresponding wireless network when the received signal quality by the subscriber identity card is worse than a predetermined threshold. According to another embodiment of the invention, the processor determines that the subscriber identity card is going to be out of the coverage range of the corresponding wireless network when the received signal quality by the subscriber identity card drops dramatically during a predetermined short time interval. It is noted that the processor may also be configured to determine the out of the coverage condition according yet another criteria, for example, some computation or statistical results of the signal qualities. Thus, the invention should not be limited thereto.

The call forwarding related supplementary service may be, as previously described, some predetermined call forwarding services provided by operators of the wireless networks, for example, a call forwarding unconditional (CFU) service or a call forwarding on mobile subscriber not reachable (CFNRc) service. Detailed registration and activation descriptions may be made to FIG. 11 and FIG. 12 with corresponding paragraphs. Thus, redundant descriptions are omitted here for brevity. According to the embodiment of the invention, when the processor determines that the service of the wireless network $NW_B$ has regained, for example, the signal quality is good enough according to another predetermined threshold, the activated call forwarding related supplementary service may be further deactivated or erased. Detailed deactivation and erasure descriptions may be made to FIG. 13 and FIG. 14 with corresponding paragraphs. Thus, redundant descriptions are omitted here for brevity.

According to a third embodiment of the invention, referring to the communication apparatuses 100B and 100C shown in FIG. 2 and FIG. 3, equipped with more than one radio transceiver module each corresponding to one subscriber identity card. When detecting battery low, only one radio transceiver module is kept working and the others will be turned off to reduce the power consumption and lengthen the life of a battery (e.g. 107 of FIG. 2 or 3). According to a fourth embodiment of the invention, referring to the communication apparatus 100A shown in FIG. 1, equipped with only one radio transceiver module. When detecting battery low, the radio transceiver module will be directed not to listen to one of the camped on cells, for example, $Cell_B$, to reduce the power consumption and lengthen the life of a battery (e.g. 107 of FIG. 2 or 3). In order to maintain the communication capability in above situations, the processor (e.g. 105A, 105B and/or 105C) monitors an amount of remaining power of the battery 107, and may activate a service instructing one of the wireless networks (for example, $NW_A$ and $NW_B$) to transfer a communication request of one subscriber identity card $CN_A$ or $CN_B$ corresponding to the radio transceiver module to be turned off or corresponding to the cell not to be listened to another subscriber identity card when the amount of remaining power is lower than an acceptable level.

Figure 10:
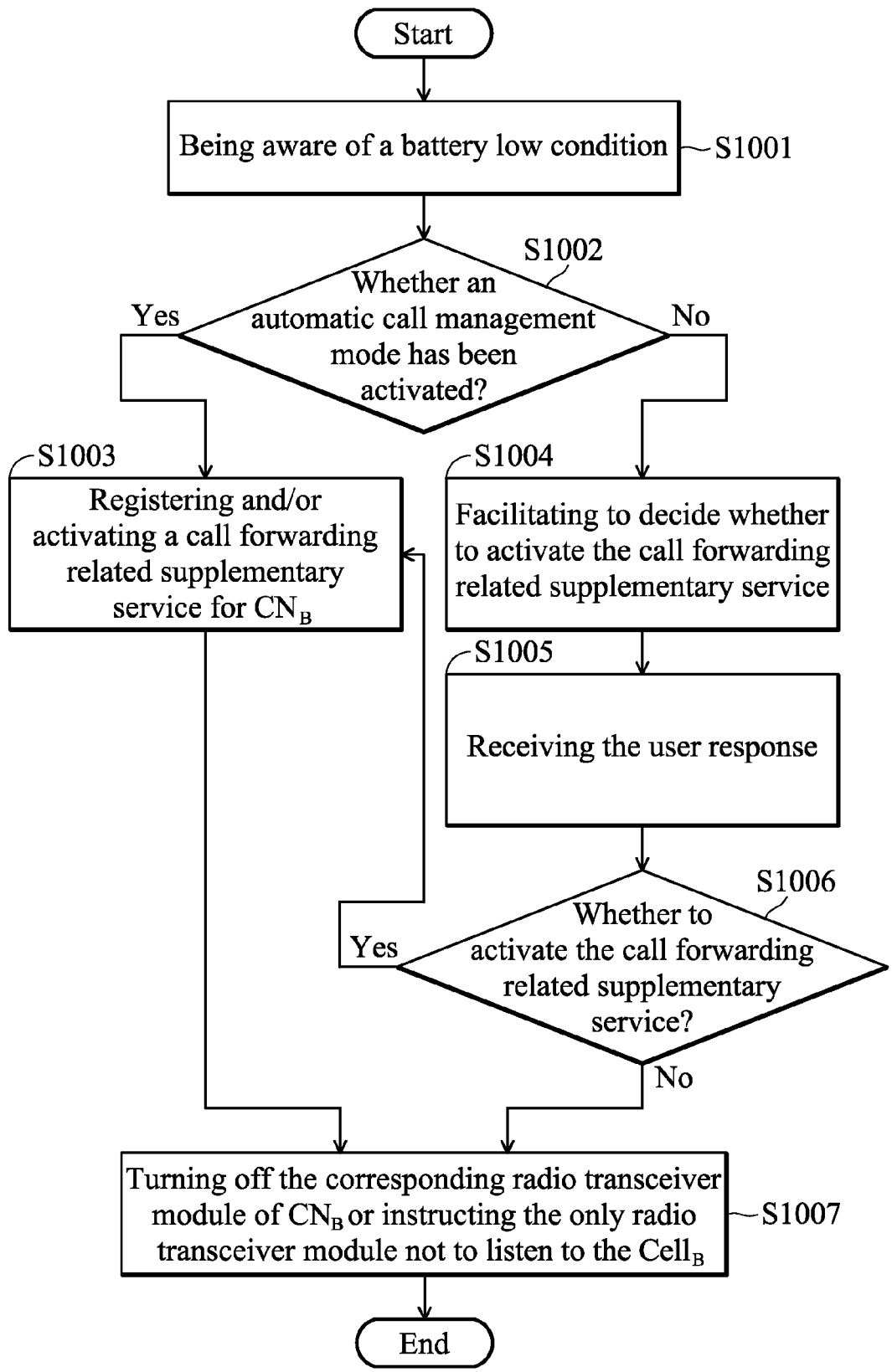
FIG. 10 shows a flow chart of the method for increasing communication capability of the communication apparatus according to a third or fourth embodiment of the invention.

FIG. 10 shows a flow chart of the method for reducing power consumption without degrading capability of incoming call receipt according to the third or fourth embodiment of the invention. When the processor determines that a battery is at a low condition (Step S1001), for example, when the amount of remaining power of the battery 107 is less than a predetermined threshold, the processor determines whether an automatic call management mode has been activated (Step S1002). As previously described, the automatic call management mode may be activated or deactivated by the user in advance via the MMI. When the automatic call management mode has been activated, the processor registers and/or activates a call forwarding related supplementary service for one of the subscriber identity cards corresponding to a radio transceiver module to be turned off (Step S1003). As an example, when a radio transceiver module corresponding to the subscriber identity card $CN_B$, such as 104B of FIG. 2 or 3, is determined to be turned off, the processor registers and/or activates a call forwarding related supplementary service by transmitting a corresponding transfer request with the address of subscriber identity card $CN_A$ (as the forwarding destination) to the cell $Cell_B$ that the subscriber identity card $CN_B$ camps on, so as to request the wireless network $NW_B$ to forward all subsequently incoming apparatus terminated communication request(s) of the subscriber identity card $CN_B$ to the subscriber identity card $CN_A$. Note that, while the corresponding radio transceiver module is turned off as described in the third embodiment or the radio transceiver module is directed not to listen to the corresponding cell as described in the fourth embodiment, the user can still be informed that an apparatus terminated communication request originally to the subscriber identity card $CN_B$ is coming via the active radio transceiver module, such as 104A of FIG. 2 or 3, or the other listened cell. Thereafter, the user can decide to answer the newly coming apparatus terminated communication request. On the other hand, when the automatic call management mode is not been activated, the processor may prompt the user to decide whether to activate the call forwarding related supplementary service with the MMI (Step S1004), for example, showing a prompt message "The call forwarding service has not been started yet, want to activate it?", and two buttons captioned "YES" and "NO" on a display device thereof, and waiting for pressing or touching signals corresponding to the displayed buttons. After receiving the user response (Step S1005), the processor obtains the decision and determines whether to activate the call forwarding related supplementary service accordingly (Step S1006). If so, the procedure goes to step S1003 to register and/or activate a call forwarding related supplementary service, and then, proceeds to step S1007. Otherwise, the procedure proceeds to step S1007. Finally, the processor turns off the corresponding radio transceiver module of the call forwarded subscriber identity card (e.g. $CN_B$) or instructs the only radio transceiver module not to listen to the cell that the call forwarded subscriber identity card camps on after receiving a response message indicating acceptance of the transfer request from the wireless network (Step S1007).

According to the embodiments of the invention, the call forwarding related supplementary service may be, as previously described, some predetermined call forwarding services provided by operators of the wireless networks, for example, a call forwarding unconditional (CFU) service or a call forwarding on mobile subscriber not reachable (CFNRc) service. Detailed registration and activation descriptions may be made to FIG. 11 and FIG. 12 with corresponding paragraphs. Thus, redundant descriptions are omitted here for brevity. According to the embodiments of the invention, when the processor determines that the low battery condition has subsided, for example, the battery is fully charged, the activated call forwarding related supplementary service may be further deactivated or erased. Detailed deactivation and erasure descriptions may be made to FIG. 13 and FIG. 14 with corresponding paragraphs. Thus, redundant descriptions are omitted here for brevity.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication apparatus, comprising:
a radio transceiver module;
a first subscriber identity card with a first address camping on a first cell belonging to a first wireless network via the radio transceiver module;
a second subscriber identity card with a second address camping on a second cell belonging to a second wireless network via the radio transceiver module; and
a processor coupled to the radio transceiver module, the first subscriber identity card and the second subscriber identity card, after receiving a communication request requesting for establishing wireless communication between the first subscriber identity card and a peer communication entity, activating a service instructing the second wireless network to transfer a future apparatus terminated communication request of the second subscriber identity card to the first subscriber identity card via the first cell.

2. The communication apparatus as claimed in claim 1, wherein the communication request is an apparatus originated communication request, the processor transmits a transfer request to the second cell to request the second wireless network to transfer the future apparatus terminated communication request of the second subscriber identity card to the first subscriber identity card via the first cell.

3. The communication apparatus as claimed in claim 2, wherein the processor transmits the transfer request before transmitting a channel request message requesting a communication channel for the apparatus originated communication request to the first wireless network.

4. The communication apparatus as claimed in claim 3, wherein the processor deactivates or erases the service after terminating the wireless communication for the received apparatus originated communication request.

5. The communication apparatus as claimed in claim 1, wherein when the communication request is an apparatus terminated communication request, the processor transmits a transfer request to the second cell to request the second wireless network to transfer the future apparatus terminated communication request of the second subscriber identity card to the first subscriber identity card via the first cell.

6. The communication apparatus as claimed in claim 5, wherein the processor transmits the transfer request before transmitting a paging response message acknowledging the received communication request to the first wireless network.

7. The communication apparatus as claimed in claim 6, wherein the processor deactivates or erases the service after terminating the wireless communication for the received apparatus terminated communication request.

8. The communication apparatus as claimed in claim 1, wherein the service is activated by transmitting a transfer request to request to the second wireless network to activate a call forwarding related supplementary service so as to forward the future apparatus terminated communication request of the second subscriber identity card to the first subscriber identity card.

9. The communication apparatus as claimed in claim 8, wherein the call forwarding related supplementary service is one of a call forwarding unconditional (CFU) service and a call forwarding on mobile subscriber not reachable (CFNRc) service.

10. The communication apparatus as claimed in claim 1, wherein at least one of the first subscriber identity card and the second subscriber identity card is the subscriber identity module (SIM) card corresponding to the global system for mobile communications (GSM) communication system, the universal subscriber identity module (USIM) card corresponding to the universal mobile telecommunications system (UMTS) communication system, or the removable user identity module (RUIM) card or the CDMA subscriber identity module (CSIM) card corresponding to the code division multiple access (CDMA) 2000 communication system.

11. A communication apparatus, comprising:
at least one radio transceiver module;
a first subscriber identity card with a first address camping on a first cell belonging to a first wireless network via the radio transceiver module;
a second subscriber identity card with a second address camping on a second cell belonging to a second wireless network via the radio transceiver module; and
a processor coupled to the radio transceiver module, the first subscriber identity card and the second subscriber identity card, monitoring a first signal quality of the first wireless network for the first subscriber identity card and a second signal quality of the second wireless network for the second subscriber identity card, and activating a service instructing the second wireless network to transfer a future apparatus terminated communication request of the corresponding second subscriber identity card to the first subscriber identity card via the first cell when determining that the second subscriber identity card is going to out of service according to the second signal quality.

12. The communication apparatus as claimed in claim 11, wherein the processor further transmits a transfer request to the second cell to request the second wireless network to transfer the future apparatus terminated communication requests of the second subscriber identity card to the first subscriber identity card via the first cell when the processor determines that the second subscriber identity card is going to be out of the coverage range of the second wireless network according to the second signal quality.

13. The communication apparatus as claimed in claim 12, wherein the processor determines that the second subscriber identity card is going to be out of the coverage range of the second wireless network when the second signal quality is worse than a predetermined threshold.

14. The communication apparatus as claimed in claim 12, wherein the processor determines that the second subscriber identity card is going to be out of the coverage range of the second wireless network when the second signal quality drops dramatically during a predetermined short time interval.

15. The communication apparatus as claimed in claim 12, wherein the processor deactivates or erases the service after determining that the second subscriber identity card regains service.

16. A communication apparatus, comprising:
a first radio transceiver module;
a second radio transceiver module;
a first subscriber identity card with a first address camping on a first cell belonging to a first wireless network via the first radio transceiver module;
a second subscriber identity card with a second address camping on a second cell belonging to a second wireless network via the second radio transceiver module;
a battery providing power to the first radio transceiver module and the second radio transceiver module; and
a processor coupled to the battery, the first radio transceiver module, the second radio transceiver module, the first subscriber identity card and the second subscriber identity card, monitoring an amount of remaining power of the battery, activating a service instructing the second wireless networks to transfer a future apparatus terminated communication request of the second subscriber identity card to the first subscriber identity card via the first cell and turning off the second radio transceiver module after determining a power low condition according to the amount of remaining power.

17. The communication apparatus as claimed in claim 16, wherein the processor further transmits a transfer request to the second cell to request the second wireless network to transfer the future apparatus terminated communication requests of the second subscriber identity card to the first subscriber identity card via the first cell after determining the amount of remaining power is less than a predetermined threshold.

18. The communication apparatus as claimed in claim 17, wherein the processor further turns off the second radio transceiver module after receiving a response message from the second wireless network indicating acceptance of the transfer request.

19. The communication apparatus as claimed in claim 18, wherein the processor deactivates or erases the service after determining the low battery condition has subsided.

20. A communication apparatus, comprising:
a radio transceiver module;

a first subscriber identity card with a first address camping on a first cell belonging to a first wireless network via the radio transceiver module;

a second subscriber identity card with a second address camping on a second cell belonging to a second wireless network via the radio transceiver module;

a battery providing power to the radio transceiver module; and a processor coupled to the battery, the radio transceiver module, the first subscriber identity card and the second subscriber identity card, monitoring an amount of remaining power of the battery, and activating a service instructing the second wireless networks to transfer a future apparatus terminated communication request of the second subscriber identity card to the first subscriber identity card via the first cell and instructing the radio transceiver module not to listen to the second cell after determining a power low condition according to the amount of remaining power.

21. The communication apparatus as claimed in claim 20, wherein the processor further instructs the radio transceiver module not to listen to the second cell after receiving a response message from the second wireless network indicating acceptance of the transfer request.

* * * * *